Aug. 20, 1929. E. M. LINEHAN Re. 17,408

RADIO ATTACHMENT FOR PHONOGRAPHS

Original Filed April 2, 1923

Inventor

Edward E. Linehan

By

Mauro, Cameron, Lewis & Kirkham,

Attorneys

Reissued Aug. 20, 1929. Re. 17,408

UNITED STATES PATENT OFFICE.

EDWARD EMANUEL LINEHAN, OF ST. PAUL, MINNESOTA, ASSIGNOR TO VICTOR TALKING MACHINE COMPANY, OF CAMDEN, NEW JERSEY, A CORPORATION OF NEW JERSEY.

RADIO ATTACHMENT FOR PHONOGRAPHS.

Original No. 1,516,745, dated November 25, 1924, Serial No. 629,358, filed April 2, 1923. Application for reissue filed January 23, 1926. Serial No. 83,381.

My invention relates to improvements in radio attachments for phonographs.

It has become common practice to employ the sound amplifying horns of phonographs to amplify sounds from the different radio receiving instruments. Some of the methods of application of said instruments to phonograph horns involve the mutilation thereof and the resultant sacrifice in the resonance of the horn. Other methods of application result in rendering the usually artistic cabinets unsightly in appearance and are often attended with laborious manipulation required to convert the phonograph mechanism for use in connection with radio equipment and in adapting it again to normal use.

An object of my invention is to provide a simple attachment for phonographs, which is easily applied thereto, without undesirably affecting the artistic features thereof, and which may be easily and quickly operated to alternately adapt the phonograph amplifier for use with the sound producing means of the phonograph and with such means of another device.

More specifically it is my object to provide, in a device of the present nature, a movable mounting common to the sound producing devices of a phonograph and a radio receiving set, the movement of said mounting serving to selectively bring said devices into communication with the phonograph amplifier and serving further, in either case, to modify the volume of sound, as may be desired.

With the foregoing and other objects in view, which will appear in the following description, the invention resides in the novel combination and arrangement of parts and in the details of construction hereinafter described and claimed.

Figure 1:
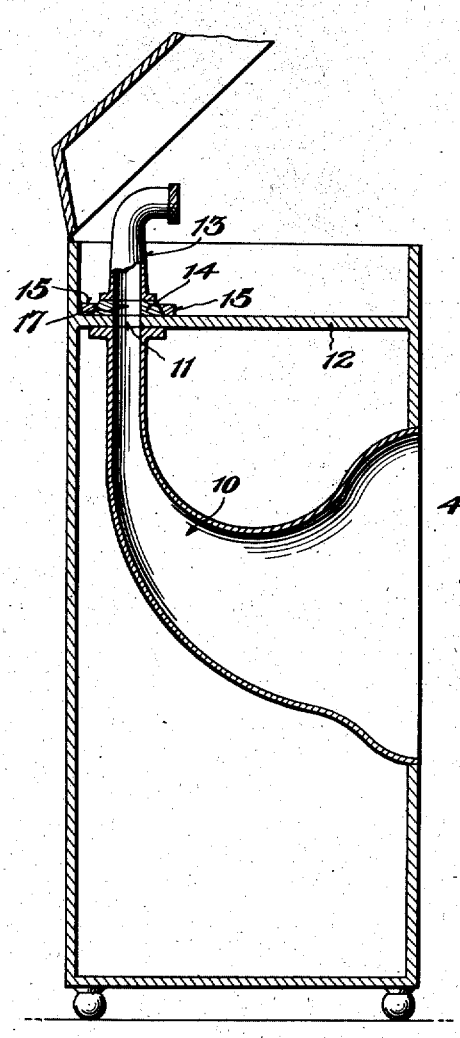
Figure 2:
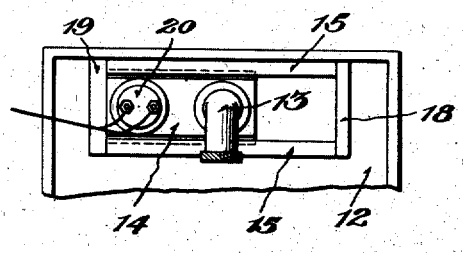
Figure 3:
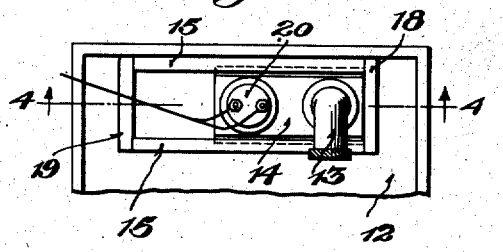
Figure 4:
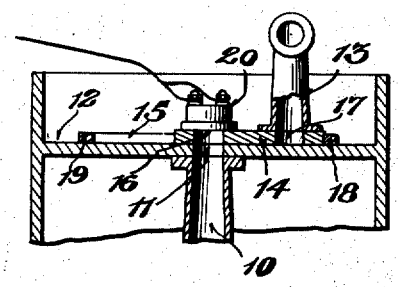

In the drawings, Fig. 1 is a diagrammatical view in vertical, central section, illustrating a conventional phonograph and my improved attachment applied thereto; Figs. 2 and 3 are views illustrating a portion of the top of the cabinet body and showing the converter slide, in plan, in different positions and Fig. 4 is a vertical sectional view in detail taken on the line 4—4 of Fig. 3.

Referring to the drawing, A indicates the cabinet of a conventional phonograph, the same having the ordinary sound amplifying horn 10 registering at its receiving end with an opening 11 in the head piece or motor board 12. Instead of fixedly mounting the usual hollow base 13 of the phonograph tone arm on the head piece 12 in position covering the opening 11, I supply a special mounting therefor. This mounting comprises a plate or slide 14 having beveled side edges slidably interlocked with correspondingly beveled guides 15. Said slide is formed with openings 16 and 17 therethrough, the opening 16 being arranged to rest in full registration with the opening 11 in the head piece 12 when the slide 14 is moved to its extreme right position (Figs. 3 and 4) with the right end thereof against a stop or abutment 18.

The opening 17 in said slide is arranged to fully register with said opening 11, when the slide 14 occupies extreme left position (Figs. 1 and 2) with the left end thereof against a stop or abutment 19. The base 13 of the tone arm is mounted on the slide 14 so as to cover the opening 17 and a loud speaking radio receiver 20 or other sound conducting instrument is mounted on said slide so as to cover the opening 16. In using the phonograph, the slide 14 occupies the position shown in Figs. 1 and 2, wherein the tone arm of the phonograph is brought into communication with the horn 10, said horn being converted to use in connection with the radio speaker 20 by merely shifting the slide 14 to the right and thereby bringing the radio instrument into communication with said horn. Thus, it will be understood that the user, by a simple thrust of the slide 14, can employ the horn 10 as an amplifier for the phonograph or for other associated sound reproducing means. It will also be understood that adjustment of the slide restricting registration of the openings 16 and 17 with the opening 11 will modify the volume of sound issuing from the horn 10.

Changes in the specific form of my invention, as herein disclosed, may be made within the scope of what is claimed without departing from the spirit of my invention.

What is claimed is:

1. The combination with a phonograph including the usual amplifying horn and hollow tone arm base and also with a radio sound producing instrument, of a slide supplying a mounting for said base and instrument, said slide traversing the receiving end of said horn and having openings therethrough arranged to severally register with said end of said horn, one opening being in communication with said base and the other with said instrument.

2. The combination with a phonograph including the usual amplifying horn and hollow tone arm base and also with a radio sound producing instrument, of a mounting for said base and instrument, said mounting having openings therethrough, one for communication with said base and one for communication with said instrument, the mounting being movable to selectively guide said openings into registration with the receiving end of said horn.

3. The combination with a phonograph including the usual amplifying horn and hollow tone arm base and also with a radio sound producing instrument, of a mounting for said base and instrument, said mounting having openings therethrough, one for communication with said base and one for communication with said instrument, the mounting being movable to selectively guide said openings into registration with the receiving end of said horn and opposed abutments to stop said mounting in positions acquiring full registration of said openings with said end of said horn.

4. The combination with a phonograph including its amplifying horn and tone arm and also with a radio sound producing instrument, of means mounting said tone arm and instrument for simultaneous movement whereby either said tone arm or said instrument may be moved into communication with said horn and the other moved out of communication with said horn.

5. The combination with a phonograph including its amplifying horn and tone arm and also with a radio sound producing instrument, of a unitary support for said tone arm and said instrument, said support being movable to selectively bring either said tone arm or said instrument into communication with said horn.

6. The combination with a phonograph including its amplifying horn and tone arm and also with a radio sound producing instrument, of a member movably mounted with respect to the amplifying horn and mechanically connected to move said tone arm and instrument whereby said tone arm and instrument may be selectively brought into communication with said horn by the movement of said member.

7. In combination with a cabinet, a sound amplifier mounted on the cabinet, a sound conducting member, an electrical sound producing instrument, and a unitary support for said member and said instrument movably mounted on said cabinet, said support being movable rectilinearly to selectively bring said member or said instrument into operative relation with said amplifier.

8. The combination with a phonograph, having an amplifying horn and a tone arm, and an electrical sound producing instrument, of a support for said tone arm and instrument, said support being rectilinearly movable to selectively bring either said tone arm or said instrument into communication with said horn.

9. In combination, a cabinet, a sound amplifying horn immovably mounted on the cabinet, a member mounted on the cabinet, a sound conduit on said member, and an electrical sound producing instrument on said member, said member being movable to selectively bring either said sound conduit or said instrument into operative relation with said horn.

10. The combination with a phonograph including a stationary amplifying horn and a movably mounted sound instrument and tone arm movably mounted above the motor board, of rectilinearly slidable means adapted to severally guide said tone arm and instrument into communication with said horn.

In testimony whereof I have signed this specification.

EDWARD EMANUEL LINEHAN.